(12) United States Patent
Mori

(10) Patent No.: US 6,336,562 B1
(45) Date of Patent: Jan. 8, 2002

(54) BICYCLE PARKING DEVICE

(75) Inventor: Akira Mori, Hachioji (JP)

(73) Assignee: Japan Steel Construction Industry Co., Ltd., Tokyo (JP)

(*) Notice: Subject to any disclaimer, the term of this patent is extended or adjusted under 35 U.S.C. 154(b) by 0 days.

(21) Appl. No.: 09/614,228

(22) Filed: Jul. 11, 2000

(30) Foreign Application Priority Data

Jul. 12, 1999 (JP) .................................. 11-197362

(51) Int. Cl.[7] .................................................. A47F 5/00
(52) U.S. Cl. ................................... 211/20; 211/162
(58) Field of Search .......................... 211/17, 22, 151, 211/162, 20, 1.51, 1.55, 1.57; D12/115; 312/198–201; 414/276, 286; 280/160.1

(56) References Cited

U.S. PATENT DOCUMENTS

| | | | |
|---|---|---|---|
| 3,762,335 A | * 10/1973 | Baker, Jr. et al. ............ 312/198 |
| 4,123,126 A | * 10/1978 | Querengasser .............. 312/201 |
| 4,153,312 A | * 5/1979 | Taniwaki ..................... 312/198 |
| 4,352,432 A | * 10/1982 | Smith .......................... 211/19 |
| 4,417,524 A | * 11/1983 | Quinn et al. ................. 312/198 |
| 4,442,961 A | * 4/1984 | Bott ............................. 211/19 |
| 4,911,507 A | * 3/1990 | Leist ........................... 312/201 |
| 4,988,251 A | * 1/1991 | Kinney ........................ 414/276 |
| 5,007,351 A | * 4/1991 | Muth ........................... 211/1.5 |
| 5,025,932 A | * 6/1991 | Jay .............................. 211/20 |
| 5,301,817 A | * 4/1994 | Merritt ........................ 211/20 |
| D353,353 S | * 12/1994 | Katsaros ..................... D6/513 |
| 5,560,498 A | * 10/1996 | Porter ......................... 211/20 |
| 5,567,103 A | * 10/1996 | Konstant ..................... 414/276 |
| 5,597,217 A | * 1/1997 | Hoska et al. ................ 312/201 |
| 5,988,403 A | * 11/1999 | Robideau .................... 211/20 |
| 6,027,190 A | * 2/2000 | Stewart et al. .............. 312/201 |
| 6,062,396 A | * 5/2000 | Eason ......................... 211/17 |

* cited by examiner

Primary Examiner—Daniel P. Stodola
Assistant Examiner—Jennifer E. Novosad
(74) Attorney, Agent, or Firm—Finnegan, Henderson, Farabow, Garrett & Dunner, L.L.P.

(57) ABSTRACT

A bicycle parking device for parking a plurality of bicycles thereon adjacent to each other, wherein a pair of rails, substantially U-shaped in vertical section, are extended in parallel with each other with a predetermined space provided therebetween substantially corresponding to a space between the axes of two wheels of a bicycle, each of the rails being formed with upper and lower horizontal walls and a vertical wall connecting said upper and lower horizontal walls at one side thereof to provide a guide groove at the other side thereof. A bicycle parking mount is extended across the rails and includes a bottom wall of a predetermined width for supporting the wheels of the bicycle thereon, a fence for preventing the bicycle from falling down, and a stopper for engaging at least one of the wheels of the bicycle. Guides support the parking mount on the pair of rails, the guides including at least a pair of guide members which are longer than the width of the bottom wall of the bicycle parking mount. Each of the guide members has a guide roller arrangement including a first group of guide rollers engaging the guide groove of each rail and a second group of guide rollers engaging the vertical wall of the rail, each of the guide members being fixedly connected to the bicycle parking mount.

3 Claims, 6 Drawing Sheets

BICYCLE PARKING DEVICE

BACKGROUND OF THE INVENTION

1. Field of the Invention

The present invention relates to a bicycle parking device, and, more particularly, to a device which is simple in structure, smooth in operation, and may be used in a limited space to park many bicycles neatly thereon.

2. Description of the Related Art

Bicycle parking devices are generally installed, for example, in an open space in front of rail road stations, in the neighborhood of apartment houses or the like for rent to individual users under a monthly or temporary contract. Such a bicycle parking device is generally designed to park many bicycles in alignment with each other.

The bicycle parking device is generally required to park many bicycles to be arranged as close as possible to each other in a predetermined limited space as defined thereby.

A conventional bicycle parking device has bicycle parking mounts so formed as to support the bicycles in a manner to relatively raise the adjacent front wheels of bicycles alternately to avoid the interference between the adjacent handles and/or front baskets of bicycles, thereby to closely arrange so many bicycles.

However, in this case, the user is required to exert some strength and technique to raise the front part of bicycles to set the bicycle on the target bicycle parking mount. Further, in case the user takes out the bicycle from the lower bicycle parking mount on which the bicycle is supported, the handle of bicycle will often bump against the front basket of the adjacent bicycle supported on the higher bicycle parking mount.

Another conventional bicycle parking device has the bicycle parking mounts so formed as to support the bicycles on a same level adjacent to each other with the handles being directed in the opposite directions alternately to avoid the interference between the adjacent handles while the bicycle parking mounts may be movable to and away from the adjacent ones.

According to the conventional bicycle parking device, guide rollers of the bicycle parking mounts, which have a substantially V-shaped periphery, are in engagement with a pair of guide rails, which are a substantially inverted V-shape in vertical section and extend in parallel with each other. In this case, the guide rollers will stumble on the guide rails with a force applied to the bicycle parking mounts, for example, by a foot and will not smoothly work. Further trash, fallen leaves and the like become attached to the device will prevent the guide rollers from working smoothly. Such a bicycle parking device will require frequent cleaning, which is rather difficult, troublesome and time consuming.

SUMMARY OF THE INVENTION

It is, therefore, an object of the invention to provide a bicycle parking device which is compact in structure and smooth in operation.

It is another object of the invention to provide a bicycle parking device which may be used in a limited space and may park many bicycles thereon.

It is another object of the invention to provide a bicycle, parking device which is so structured as to prevent the parking bicycles from being falling down.

It is another object of the invention to provide a bicycle parking device which may be easily operated to park the bicycles thereon and to release the parking bicycles therefrom.

It is another object of the invention to provide a bicycle parking device which is so structured as to prevent the parking bicycles from being stolen.

It is another object of the invention to provide a bicycle parking device which is free of lubrication and accumulation of trashes and fallen leaves.

It is still another object of the invention to provide a bicycle parking device which is substantially maintenance-free.

For attaining the objects, the bicycle parking device of the invention comprises at least a pair of rails extending in parallel with each other with a space provided therebetween substantially corresponding to a space between the axes of two wheels of a bicycle, at least one bicycle parking mount of a predetermined width extended across the rails for supporting the wheels of a bicycle thereon; at least a pair of guide members which are longer than the width of the bicycle parking mount and have guide roller means respectively for engaging the rails to enable the guide members to move along the rails, the guide members being fixedly connected to the bicycle parking mount.

BRIEF DESCRIPTION OF THE DRAWINGS

In the accompanying drawings.

DETAILED DESCRIPTION OF THE PREFERRED EMBODIMENT

The invention will now be described in reference to a preferred embodiment as shown in the attached drawings.

Figure 1:
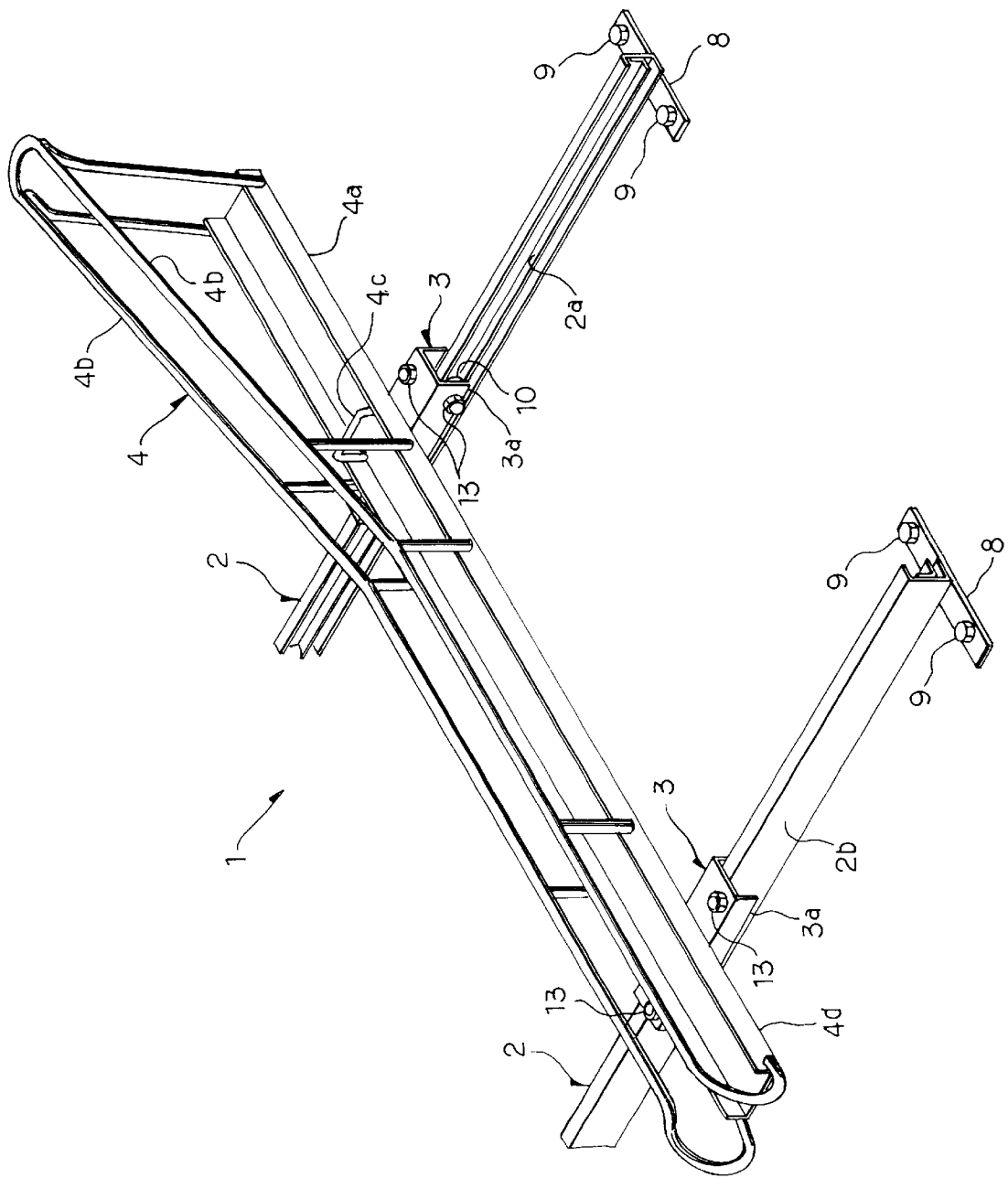
FIG. 1 is a perspective view of a bicycle parking device of the invention.
Figure 2:
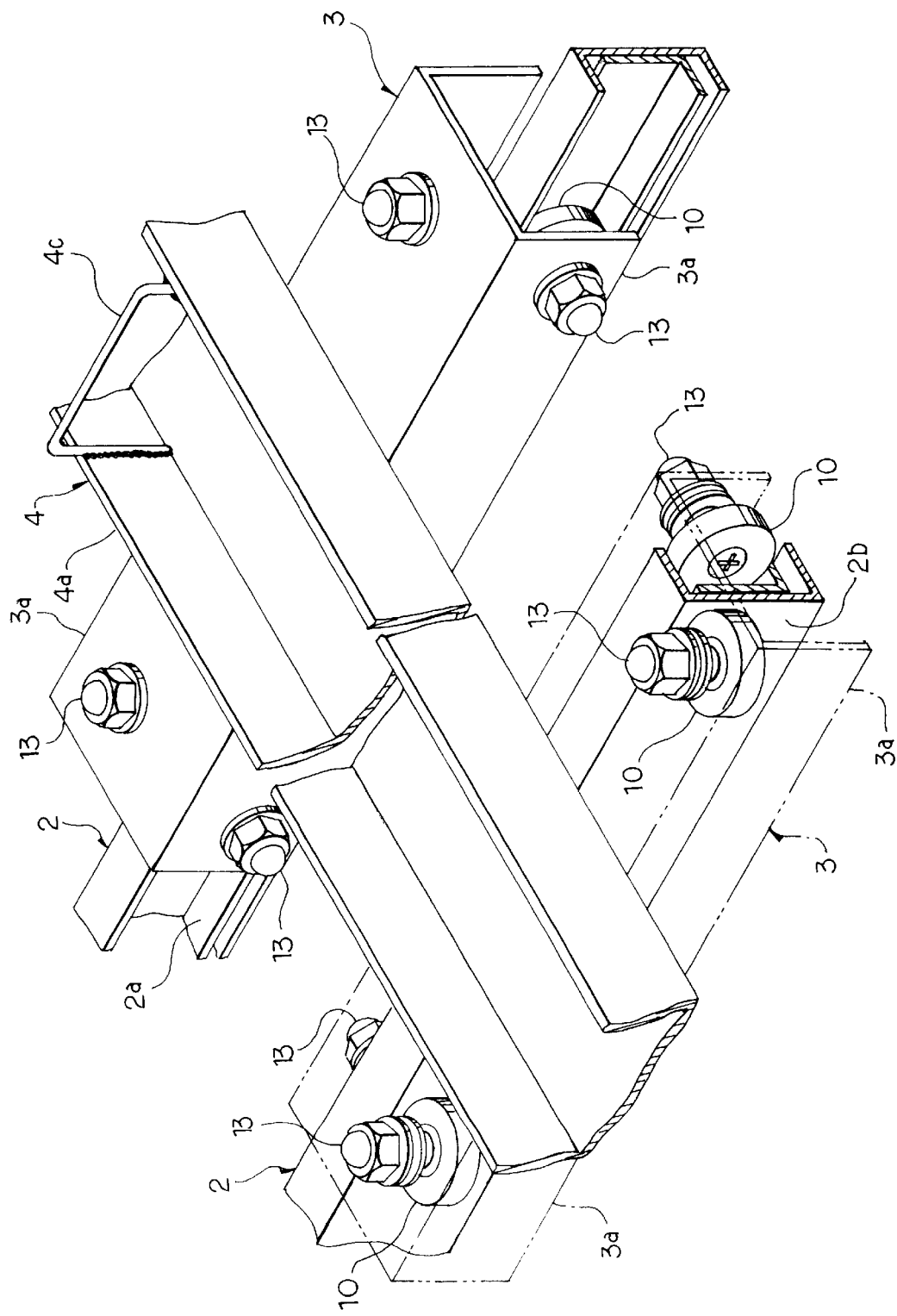
FIG. 2 is a perspective view of the essential parts of the bicycle parking device shown partly broken.
Figure 3:
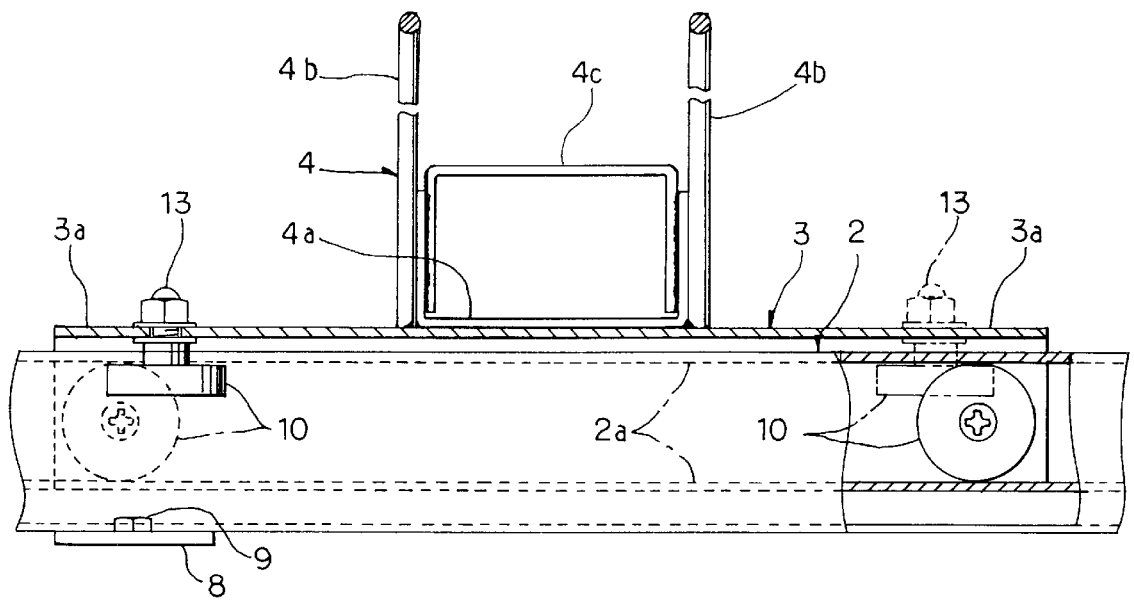
FIG. 3 is a side elevational view of the essential parts of the bicycle parking device shown partly broken and partly sectioned.

In reference to FIGS. 1 through 8, the bicycle parking device 1, according to the invention, comprises generally a pair of rails 2, a bicycle parking mount 4 and a pair of guide members 3 as shown in FIG. 1. pair of rails 2 are placed on the ground in parallel with each other with a space provided therebetween corresponding to a space between the two axes of the wheels 6a of a bicycle 6. Each of the rails 2 is U-shaped in vertical section and is formed with upper and lower horizontal walls and a vertical wall connecting the upper and lower horizontal walls at one side thereof and is opened at the other side thereof. Each of the rails 2 has the opposite ends secured to base plates 8 by welding, the base plate 8 being secured to an anchor (not shown) by means of bolts 9.

An angle member provided with a horizontal wall 2a is secured to each of the rails 2 by welding and is extended in parallel with the rail 2.

Figure 4:
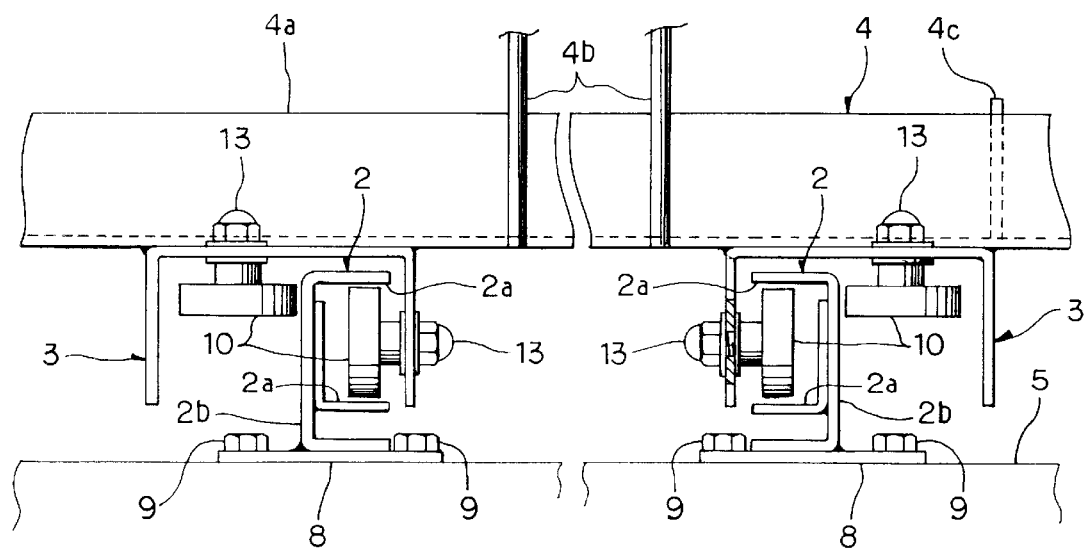
FIG. 4 is a side elevational view of the essential parts of the bicycle parking device showing the details of guide members in connection with rails of the bicycle parking device.

The guide members 3 are mounted on the rails respectively opposite to each other through guide rollers 10. Each of the guide members 3 is U-shaped in vertical section and is formed with vertical side walls 3a opposite to each other and a horizontal top wall connecting the opposite side walls and is opened at the bottom side thereof, and is longer than the width of the bicycle parking mount 4. Each of guide members 3 has a pair of guide rollers 10, one of which engages the vertical wall of the rail 2 on one side thereof and the other of which is in engagement with a guide groove defined by the horizontal wall 2a of the angle and the upper wall 2a of the U-shaped rail 2 as shown in FIG. 4.

Figure 5:
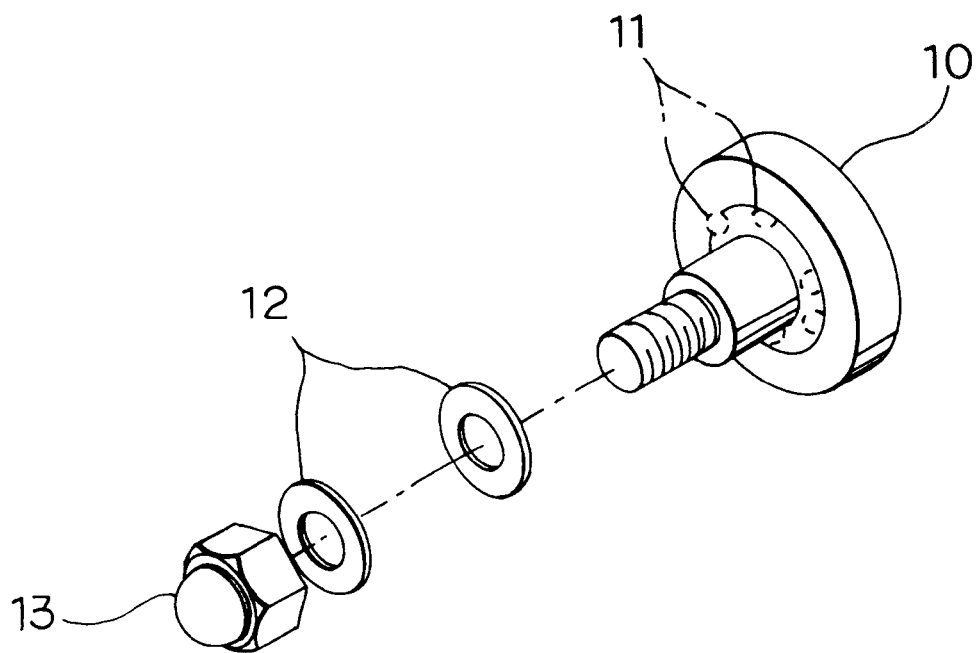
FIG. 5 is an exploded perspective view of a guide roller, washers and a cap nut.

The guide rollers 10 are made of resin by way of example and have ball bearings 11 provided therein and sealed as shown in FIG. 5.

The guide rollers 10 are mounted to the guide members 3 respectively by means of a cap nut 13 and washers 12.

The guide groove is of a width slightly larger than the diameter of the guide roller 10 such that the guide members may be moved smoothly on he rails 2.

As shown in FIG. 4, the U-shaped rails 2 are extended in parallel with each other with the opened sides being opposite to each other in symmetry, wherein the guide rollers 10 are rotatably moved as guided by the guide grooves of the rails 2.

The bicycle parking mount 4 is fixedly mounted to the guide members 3 across the rails 2.

The bicycle parking mount 4 is composed of an elongated frame which is U-shaped in vertical section and has a bottom wall 4a to support the two wheels 6a of the bicycle 6 thereon, fence 4b for preventing the bicycle 6 from falling down and stopper 4c for engaging one of the wheels 6a of the bicycle 6 to for prevent the bicycle 6 from moving away from the bicycle parking mount 4.

Figure 6:
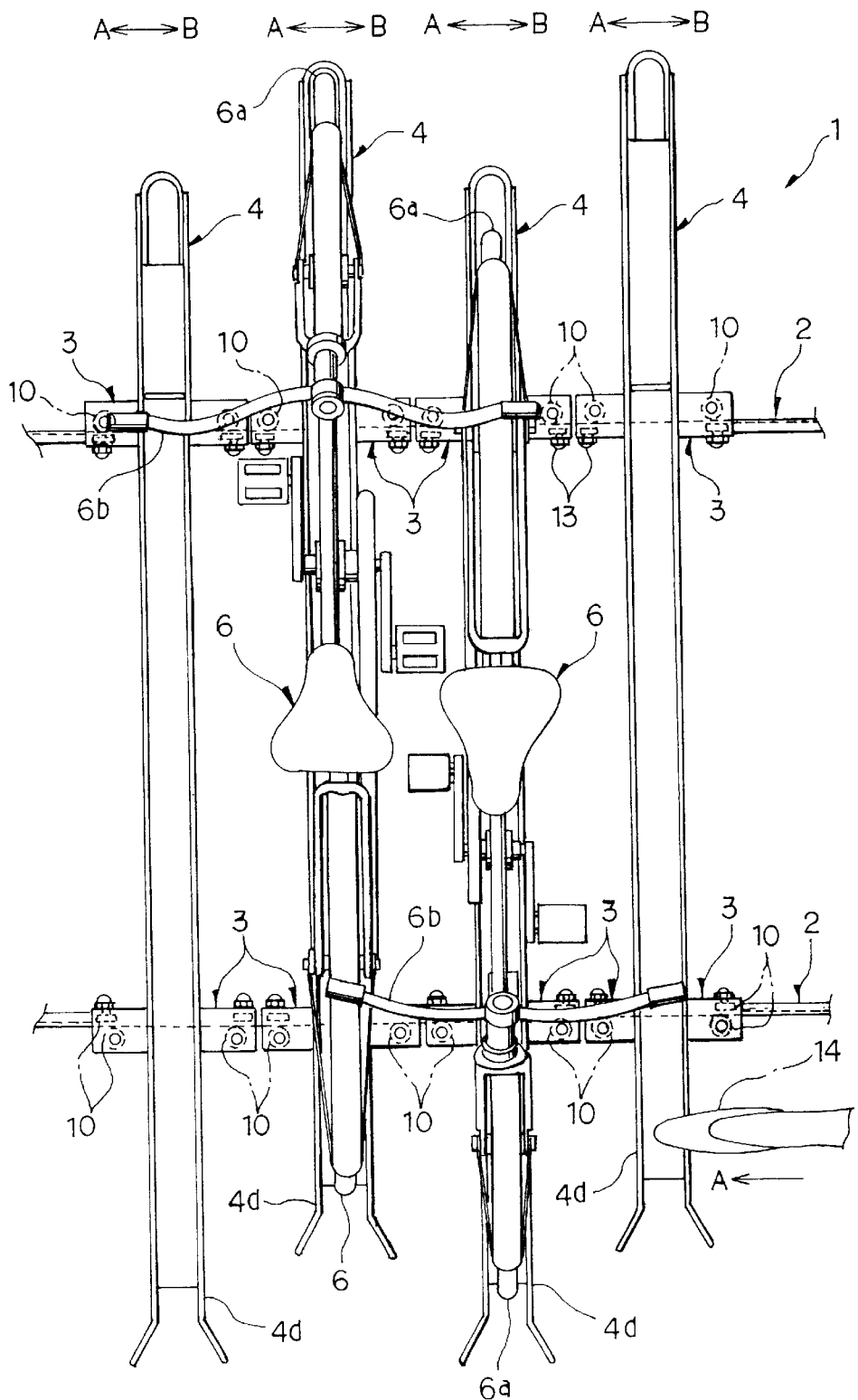
FIG. 6 is a plan elevational view of bicycle parking mounts of the bicycle parking device shown as loaded with bicycles and shown as being movable by foot.
Figure 7:
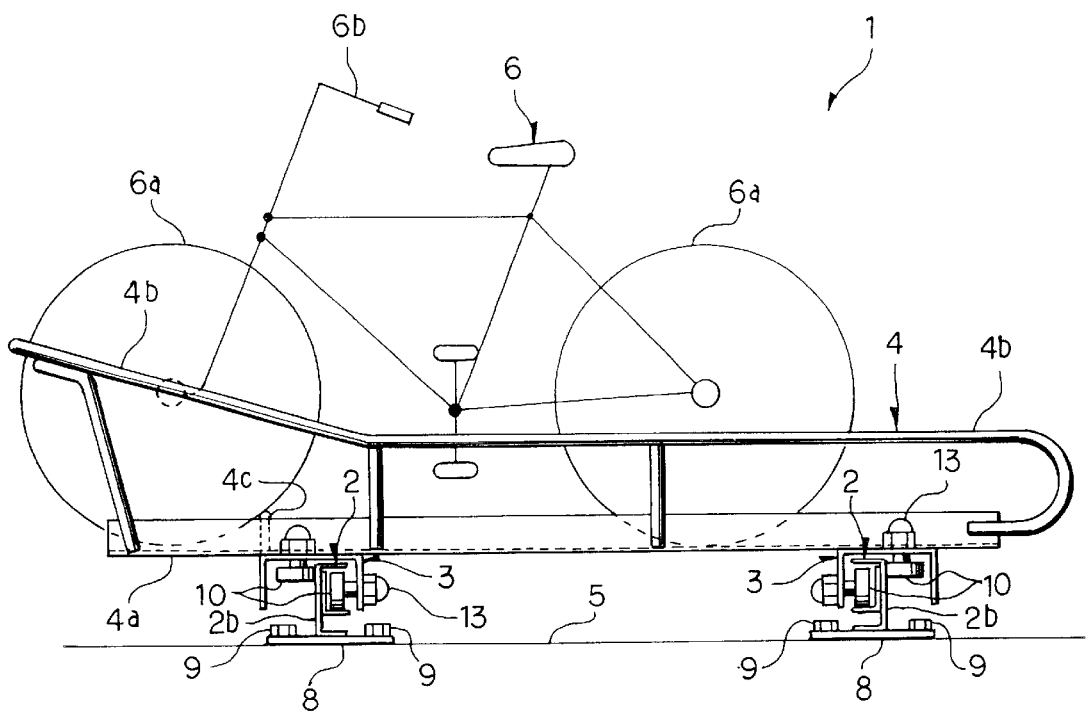
FIG. 7 is a side elevational view of the bicycle parking device shown as loaded with a bicycle.
Figure 8:
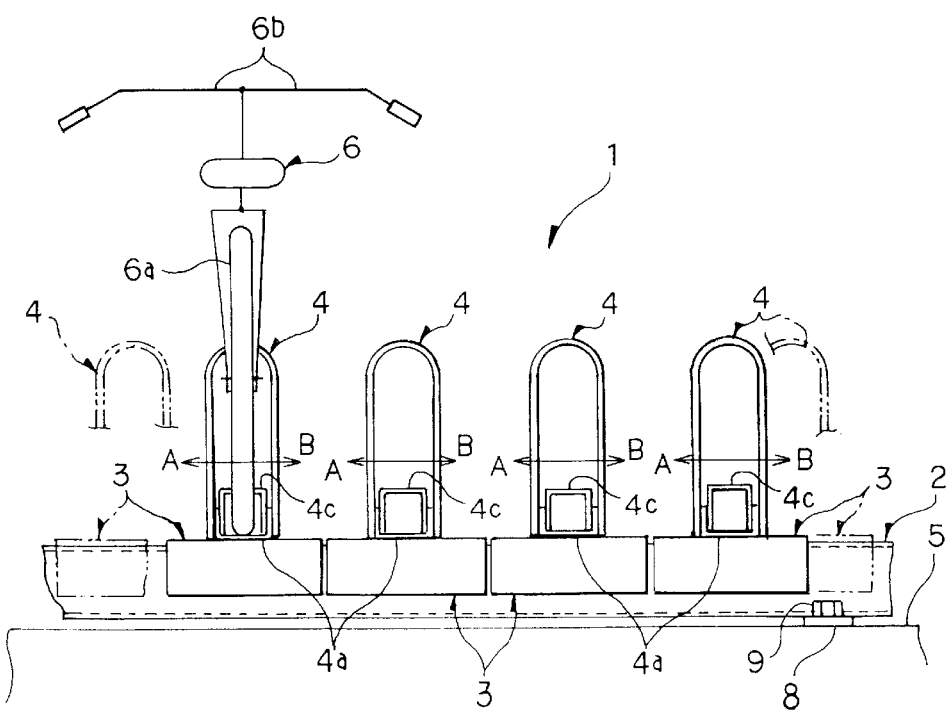
FIG. 8 is a front side elevational view of the bicycle parking device shown as loaded with a bicycle.

As shown in FIG. 6, a plurality of bicycle parking mounts 4 are mounted on the rails 2 through the guide members 3. The bicycle parking mounts 4 are directed alternately in opposite directions such that so many bicycles may be closely arranged adjacent each other without the handles 6b of the bicycles 6 being directly adjacent to each other in interferential condition.

With the bicycle parking device of the invention being of the structure as described hereinbefore, the operations are as follows.

In reference to FIGS. 1 through 8, each bicycle parking mount 4 may be easily moved along the rails 2 to and away from the adjacent bicycle parking mount 4 in the directions as indicated by arrows A and B as shown in FIG. 6. Therefore, in order to set the bicycle 6 onto a target bicycle parking mount 4 or to take it away therefrom, the bicycle parking mount 4 is manually moved away from the adjacent mounts by a slight force applied by a foot 14, for example, to one end 4d of the bicycle parking mount 4.

Each of the guide members 3 is longer than the width of the bicycle parking mount 4 and provided with four guide rollers 10 respectively at the opposite ends thereof engaging each of the guide grooves of the rails 2. Therefore, the bicycle parking mount 4 is stabilized in case the bicycle 6 is loaded thereon, and will be moved smoothly as guided along the rails 2 without being inclined to cause the guide rollers 10 to stumble in the guide grooves of the rails 2.

Further, the bicycle parking mount 4 is prevented from being disconnected from the rail 2 and from wobbling longitudinally thereof, and is further safeguarded from theft because the four guide rollers 10 of each guide member 3 engage each of the rails 2 on both sides thereof, one pair of guide rollers 10 engaging the vertical side of the rail 2 and the other pair of guide rollers 10 engaging the guide groove of the rail 2 on the opposite side, the guide groove being defined by the vertical wall 2b and upper and lower walls 2a of the rail 2.

Since the guide rollers 10 are completely sealed, special lubrication is not required and is free of trash, fallen leaves and the like, the bicycle parking device 1 requires no special maintenance work.

Further the bicycle parking device may be used in a limited space and may park so many bicycles neatly thereon.

The invention thus described, it will be obvious that the same may be varied in many ways. Such variations and modifications are not to be regarded as a departure from the spirit and scope of the invention, and all such modifications are intended to be included within the scope of the following claims.

What is claimed is:

1. A bicycle parking device for parking a plurality of bicycles, said device comprising:

at least one pair of rails extending in parallel with each other with a space provided therebetween;

at least one bicycle parking mount of a predetermined width extended across said rails for supporting the wheels of a bicycle thereon;

guide means for supporting the bicycle parking mount on the at least one pair of rails and including at least one pair of guide members that are longer than the width of said bicycle parking mount and having guide roller means for engaging said rails, respectively, to enable said guide members to move along said rails, said guide members being fixedly connected to said bicycle parking mount.

2. The bicycle parking device as defined in claim 1, wherein each of said rails is substantially U-shaped and formed with upper and lower horizontal walls and a vertical wall connecting said upper and lower horizontal walls at one side thereof to provide a guide groove at the other side thereof, said bicycle parking mount has a bottom wall of a predetermined width for supporting the wheels of the bicycle thereon, a fence for preventing the bicycle from falling down, and a stopper for engaging at least one of the wheels of the bicycle, and wherein said guide roller means includes a first group of guide rollers engaging said guide grooves of said rails and a second group of guide rollers engaging said vertical walls of said rails, each of said guide members being fixedly connected to said bicycle parking mount.

3. The bicycle parking device as defined in claim 2, wherein said rails are extended in parallel with each other with a predetermined space provided therebetween with said guide grooves thereof being opposite to each other.

* * * * *